Figure 1:

Nov. 30, 1965 H. JANSEN 3,220,285

METHOD OF MANUFACTURING METAL DISCS

Filed April 2, 1962

INVENTOR
HEINZ JANSEN

BY
AGENT

United States Patent Office 3,220,285
Patented Nov. 30, 1965

3,220,285
METHOD OF MANUFACTURING METAL DISCS
Heinz Jansen, Drachten, Netherlands, assignor to North American Philips Company, Inc., New York, N.Y., a corporation of Delaware
Filed Apr. 2, 1962, Ser. No. 184,353
Claims priority, application Netherlands, May 4, 1961, 264,415
3 Claims. (Cl. 76—104)

The invention relates to a method of manufacturing a metal disc, in particular of high-quality steel, which is provided on one side with a central projection projecting outside the side face of the disc and which has an annular projection on the other side, in particular for manufacturing cutters for rotating dry shaving apparatus.

Such discs may be turned from bar material, but in cutting off and in the further machining much material is lost which is expensive, in particular in quantity production and in connection with the fact that the material is comparatively costly. The method according to the invention is simple, while little material is lost and the machining time becomes smaller than in the known methods. According to the invention, this method is characterised in that a flat disc is pressed from plate material having a thickness which is at least equal to the maximum thickness of the desired disc wherever measured and that subsequently one side of this disc is provided with a recess by a shaving operation which recess is part of a conical surface and which conical surface is bounded on one side by a planar circular surface having a diameter which is at least equal to the outside diameter of the central projection and on the other side by a planar circular surface having a diameter which is equal to or smaller than the circumference of the disc, the height of the conical surface being equal to the desired height of the projection to be obtained, after which the other side of the disc is given a recess of the same shape likewise by a shaving operation, the boundary of which recess on one side is a planar circular surface having a diameter which is equal to the inside diameter of the annular projection and the height of the conical surface is equal to the internal height of the projection, after which the disc is subjected to a pressing operation at right angles to the side face provided with an annular projection such that the central projection projects beyond the side face at the desired height. The invention also comprises a disc which is preferably manufactured from high-quality steel according to the said method.

In order that the invention may readily be carried into effect, two embodiments thereof will now be described more fully, by way of example, with reference to the accompanying drawing, in which FIGURES 1, 2, 3 and 4 show various stages of manufacturing a disc having an annular recess on one side and a central projection on the other side which projects beyond a side face of the disc.

Figure 5:
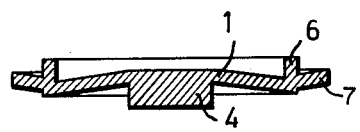

FIGURE 5 shows another embodiment of the metal disc.

Figure 2:
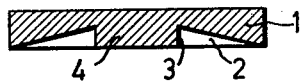
Figure 3:
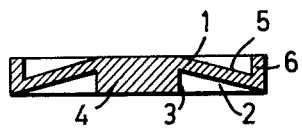
Figure 4:
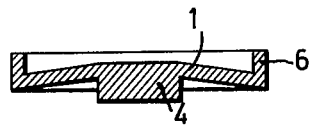

In FIGURE 1, 1 is a metal disc pressed from plate material and consisting of water-hardened tool steel. In this disc a recess 2 is turned as shown in FIGURE 2. This recess 2 has the shape of a conical surface and is bounded on the one side by the outer edge 3 of a central projection 4 and on the other side by a planar circular surface which is little smaller than the circumference of the disc. The largest depth of the recess lies on the inside and it is equal to the ultimately desired height of the projection 4. Then, as shown in FIGURE 3, the other side of the disc 1 is provided with a recess 5, likewise in the form of a conical surface, after which the largest depth is equal to the inner height of a projection 6. Both conical surfaces extend in parallel so that the body of the disc has a uniform thickness. Then the side of the projection 6 is subjected to a pressure at right angles, so that a disc is formed as shown in FIGURE 4. This metal disc may be used for manufacturing cutters of rotating dry shaving apparatus, for example by squeezing out sectors and further machining.

It is not necessary that the projection 6 is located on the edge: also a disc or annular ring 7 as shown in FIGURE 5, in which this projection has a smaller inside diameter, may be manufactured by the above method. Nor is it necessary that both conical surfaces extend in parallel; if desired, the cross-section of the disc remaining after machining may have a conical variation. The method described gives less wastage when the known method of manufacturing such discs from bar material and, also in connection with the fact that the material is comparatively costly, is cheaper and better suitable for quantity production; also with respect to the manufacture from a pressed disc the method described is cheaper.

What is claimed is:

1. A method of manufacturing a metal disc from plate material having a thickness at least equal to the maximum thickness of the desired disc comprising the steps of providing a flat disc from said plate material, machining one side of said disc to form a first annular recess therein forming one conical surface and a central projection, machining the other side of said disc to form a second annular recess of corresponding shape to said first annular recess and thereby additionally providing a peripheral upstanding circumferential projection, and pressing said central projection of said disc substantially perpendicular to the plane of said disc whereby said central projection is forced to a position in which at least the bottom surface thereof projects below the plane of the remainder of said disc.

2. A method of manufacturing a metal disc as claimed in claim 1 wherein said conical surfaces extend in parallel to each other thereby giving the disc a uniform thickness at that location.

3. A method of manufacturing a metal disc from plate material having a thickness at least equal to the maximum thickness of the desired disc comprising the steps of providing a flat disc from said plate material, machining one side of said disc to form a first annular recess therein forming one conical surface and a central projection, machining the other side of said disc to form a second annular recess of corresponding shape to said first annular recess and thereby providing an additional upstanding circumferential projection and an adjacent annular ring, the latter forming the peripheral edge of said disc, and pressing said central projection of said disc substantially perpendicular to the plane of said disc whereby said central projection is forced to a position in which at least the bottom surface thereof projects below the plane of the remainder of said disc.

References Cited by the Examiner
UNITED STATES PATENTS

| | | | |
|---|---|---|---|
| 1,372,246 | 3/1921 | Putnam | 29—159.01 |
| 1,399,951 | 12/1921 | Forsyth | 29—159.01 |
| 1,413,051 | 4/1922 | Michelin | 2—159.01 X |
| 1,714,661 | 5/1929 | Crawford et al. | 29—556 |
| 3,060,565 | 10/1962 | Vaughn | 29—558 |

WHITMORE A. WILTZ, *Primary Examiner.*